3,499,081
9-CHLOROPROGESTATIONAL AGENTS

Gerald W. Krakower, Elizabeth, and Patrick A. Diassi, Westfield, N.J., assignors to E. R. Squibb & Sons, Inc., New York, N.Y., a corporation of Delaware
No Drawing. Filed Dec. 21, 1966, Ser. No. 603,423
Int. Cl. C07c *173/00, 169/34*
U.S. Cl. 424—241                                          8 Claims

ABSTRACT OF THE DISCLOSURE

The invention disclosed herein relates to 9α-chloro-pregnanes which are highly active as progestational agents.

---

This invention relates to the synthesis of steroids and more particularly to the provision of new steroids of the Formula I (I)
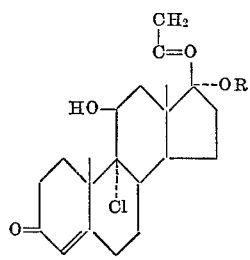

wherein R is the acyl radical of a carboxylic acid, preferably the acyl radical of a hydrocarbon carboxylic acid of less than thirteen carbon atoms, as exemplified by the alkanoic acids (e.g., acetic, propionic, butyric, enanthic and lauric acid), the alkenoic acids, the monocyclic aryl carboxylic acids (e.g., benzoic and m-toluic acid), the monocyclic aryl lower alkanoic acids (e.g., phenylacetic and β-phenylpropionic acid), the cycloalkanecarboxylic acids and the cycloalkenecarboxylic acids. Preferably, R is lower alkanoyl and optimally acetyl.

The steroids of Formula I are physiologically active substances that, unlike 9α-chloro-11β,17α-dihydroxyprogesterone, possess progestational activity. Moreover, surprisingly they are more active progestational agents than are the corresponding steroids containing a fluorine substituent in the 9α-position. Thus, the steroids of Formula I can be used for conception control, for which purpose they are administered to mammals, such as cattle or sheep, perorally in a suitable form (e.g., tablets), or mixed with feed in a dose of about ½ mg. to about 10 mg. In addition the steroids of Formula I can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

In accordance with one process of this invention, the steroids of Formula I are prepared by treating 9β,11β-oxidocortexolone with a triester of an orthoacid, preferably a tri(lower alkyl)ester of the orthoacid of a hydrocarbon carboxylic acid of less than thirteen carbon atoms, such as the trimethyl ester of an orthoalkanoic acid of less than thirteen carbon atoms (e.g., trimethylorthoacetate). The reaction is carried out in the presence of a strong acid catalyst (such as p-toluenesulfonic acid), preferably at an elevated temperature. The reaction results in the preparation of a 9β,11β-oxido-cortexolone 17,21-orthoacid ester, which are new compounds of this invention of the Formula II (II)
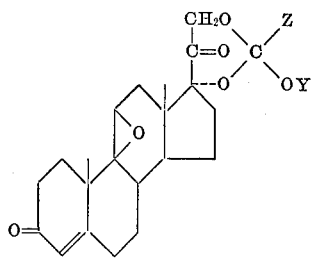

wherein Y is lower alkyl and Z is a hydrocarbon radical of less than twelve carbon atoms.

The compounds of the Formula II are then treated with a mineral acid, such as hydrochloric acid, to yield the corresponding 9β,11β-oxido-cortexolone 17-esters, new compounds of this invention of the Formula III (III)
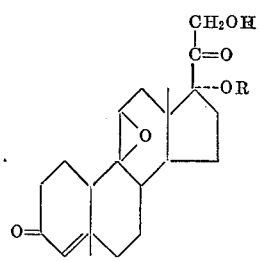

wherein R is as hereinbefore defined.

Compounds of the Formula III are then treated with a lower alkane sulfonyl halide (e.g., methanesulfonyl chloride) to yield the corresponding 21-lower alkane sulfonates, new compounds of this invention of the Formula IV (IV)
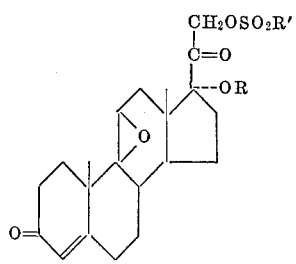

wherein R is as hereinbefore defined and R' is lower alkyl.

Compounds IV are then treated with an alkali metal iodide (e.g., sodium iodide) to yield the corresponding 21-iodo-9β,11β-oxido-17α-hydroxyprogesterone 17-esters, new compounds of this invention of the Formula V (V)
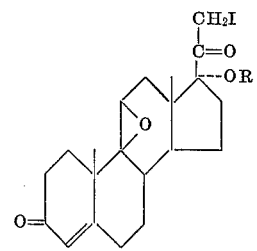

wherein R is as hereinbefore defined.

Compounds V are then treated with an alkali metal bisulfite, preferably at an elevated temperature, to yield 17-esters of 9β,11β-oxido-17α-hydroxyprogesterone of the Formula VI (VI)

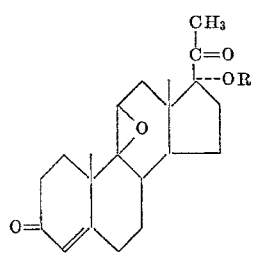

wherein R is as hereinbefore defined, which upon treatment with hydrogen chloride, yield the final products of this invention (Compounds of Formula I).

Alternatively, the final products can be prepared by treating $\Delta^{9(11)}$-cortexolone with a lower alkane sulfonyl halide (e.g., methanesulfonyl chloride) to yield the corresponding 21-lower alkane sulfonate, which are in turn treated with an acid anhydride or acyl halide of the desired acid to yield new intermediates of this invention of the Formula VII (VII)

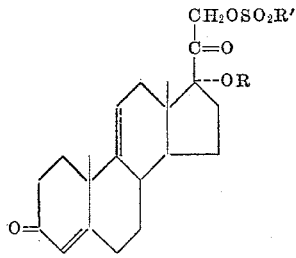

wherein R and R' are as hereinbefore defined.

Compounds VII are then treated with an alkali metal iodide and an acid, preferably at an elevated temperature, to yield 17-esters of 17α-hydroxy-$\Delta^{9(11)}$-progesterone, intermediates of this invention of the Formula VIII (VIII)

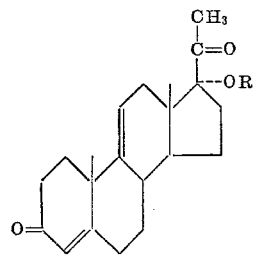

wherein R is as hereinbefore defined. Compounds VIII are then treated with an N-bromoimide of a hydrocarbon dicarboxylic acid (e.g., N-bromosuccinimide) or an N-bromoamide of a hydrocarbon carboxylic acid (e.g., N-bromoacetamide) to yield 17-esters of 9α-bromo-11β,17α-dihydroxyprogesterone which upon treatment with an alcoholic solution of a mild alkali (e.g., methanolic potassium carbonate) give the intermediates of the Formula VI of this invention.

In addition, compounds VII may be treated with an N-chloroimide of a hydrocarbon dicarboxylic acid (e.g., N-chlorosuccinimide) or an N-chloroamide of a hydrocarbon carboxylic acid (e.g., N-chloroacetamide) or with N,N-dichloro-dimethylhydantoin to yield the final products of this invention (compounds of the Formula I).

The following examples illustrate the invention (all temperatures being in centigrade):

EXAMPLE 1

9β,11β-oxido-cortexolone 17,21-orthoacetate

A solution of 1.00 g. of 9β,11β-oxido-cortexolone and 10 mg. of p-toluenesulfonic acid in 2.0 ml. of dimethylformamide and 2.0 ml. of trimethylorthoacetate is heated for 4 hours in an oil bath at a temperature of 110–120°. At the end of this period a few drops of pyridine are added to the hot solution and it is cooled and diluted with water. The reaction mixture is extracted with ethyl acetate and the latter solution washed with saturated brine, then dried and the solvent evaporated to give 982 mg. of a viscous brown oil. Slurrying the oil with methanol induces crystallization and the collected crystals, when washed with cold methanol and dried, weigh about 412 mg. Two recrystallizations from methanol give analytically pure 9β,11β-oxido-cortexolone 17,21-orthoacetate, M.P. about 187–189° $[\alpha]_D$—5.3° (chloroform).

Analysis.—Calc'd for $C_{24}H_{32}O_6$: C, 69.21; H, 7.75. Found: C, 69.34; H, 7.41.

EXAMPLE 2

9β,11β-oxido-cortexolone 17-acetate

A suspension of 4.430 g. of 9β,11β-oxido-cortexolone 17,21-orthoacetate in 90 ml. of methanol is stirred with 9.0 ml. of 0.82 N hydrochloric acid. After 240 seconds the reaction mixture is diluted with water and decanted from 150 mg. of an insoluble residue. The methanol is evaporated in vacuo and the aqueous mixture extracted with ethyl acetate. The ethyl acetate solution is washed with brine, dried and evaporated to give about 4.25 g. of residue. Recrystallization from methanol gives about 1.401 g. of 9β,11β-oxido-cortexolone 17-acetate, M.P. about 188–190°; $[\alpha]_D$—80.5° (chloroform).

Analysis.—Calc'd for $C_{23}H_{30}O_6$: C, 68.63; H, 7.51. Found: C, 68.75; H, 7.85.

EXAMPLE 3

9β,11β-oxido-cortexolone 17-acetate 21-mesylate

Methanesulfonyl chloride (1.4 ml.) is added dropwise to a cooled solution of 1.40 g. of 9β,11β-oxido-cortexolone 17-acetate in 14.0 ml. of pyridine and the mixture stirred in an ice-bath for 2 hours. The reaction mixture is then diluted with water and extracted with ethyl acetate. The ethyl acetate solution is washed with 5% hydrochloric acid and brine, dried and evaporated to give about 1.760 g. of 9β,11β-oxido-cortexolone 17-acetate 21-mesylate. The NMR of this gummy material shows peaks at 7.89τ (s., OCOCH₃ and 6.84τ (s., OSO₂CH₃).

EXAMPLE 4

17α-acetoxy-21-iodo-9β,11β-oxido-progresterone

A solution of 1.500 g. of 9β,11β-oxido-cortexolone 17-acetate 21-mesylate and 4.500 g. of sodium iodide in 45 ml. of acetone is heated at reflux temperature for 22 hours. The reaction mixture is cooled, diluted with water and filtered to give about 1.145 g. of 17α-acetoxy-21-iodo-9β,11β-oxido progesterone.

EXAMPLE 5

17α-acetoxy-9β,11β-oxido-progesterone

A solution of 1.145 g. of 17α-acetoxy-21-iodo-9β,11β-oxido-progesterone in 60 ml. of dioxane and 60 ml. of 5% aqueous sodium bisulfite is heated on a steam bath for 4 hours. The solution is then cooled, diluted with water and the dioxane evaporated in vacuo. The resulting precipitate is filtered and dried and after recrystallization from methanol gives about 501 mg. of 17α-acetoxy-9β,11β-oxido-progesterone, M.P. 221–223°.

EXAMPLE 6

17α-acetoxy-9α-chloro-11β-hydroxy-progesterone

A solution of 1.500 g. of 17α-acetoxy-9β,11β-oxido-progesterone in 20 ml. of chloroform is cooled in an ice-bath and treated with 20 ml. of chloroform saturated with hydrogen chloride. The mixture is stirred at 0–5° for 2 hours and then diluted with chloroform to 100 ml. and poured into saturated brine and shaken well. The chloroform solution is then washed with brine, dried and evaporated to give about 2.012 g. of yellow oil which crystallizes on the addition of methanol. Recrystallization from methanol gives about 1.140 g. of 17α-acetoxy-9α-chloro-11β-hydroxy-progesterone, M.P. about 212.5–214°. The analytical sample has M.P. about 213.5–214.5°, $[\alpha]_D+99°$ (chloroform).

*Analysis.*—Calc'd for $C_{23}H_{31}O_5Cl$: C, 65.32; H, 7.39; Cl, 8.38. Found: C, 65.74; H, 7.45; Cl, 8.65.

EXAMPLE 7

$\Delta^{9(11)}$-cortexolone 21-mesylate

A solution of 1.00 g. of $\Delta^{9(11)}$-cortexolone in 10.0 ml. of pyridine is cooled in an ice-bath and treated with 1.00 ml. of methanesulfonyl chloride. After 2½ hours of stirring in the cold, water is added and the resulting precipitate is collected and dried. Recrystallization from methanol gives about 910 mg. of $\Delta^{9(11)}$-cortexolone 21-mesylate, M.P. about 196–197°, $[\alpha]_D+108°$ (chloroform).

*Analysis.*—Calc'd for $C_{22}H_{30}O_6S$: C, 62.54; H, 7.16; S, 7.58. Found: C, 62.16; H, 7.34; S, 7.39.

EXAMPLE 8

$\Delta^{9(11)}$-cortexolone 17-acetate 21-mesylate

A suspension of 272 mg. of $\Delta^{9(11)}$-cortexolone 21-mesylate in a mixture of 12 ml. of glacial acetic acid and 3 ml. of acetic anhydride containing 300 mg. of p-toluenesulfonic acid is stirred at room temperature. After about 2 hours, solution is complete and 22 hours the excess anhydride is decomposed by the addition of ice and the reaction mixture is then diluted with water. The resulting crystals are filtered and after drying weigh about 267 mg. This material is suspended in methanol to which 0.15 ml. of concentrated hydrochloric acid is then added. The suspension is stirred at room temperature for 5 hours. The reaction mixture is diluted with water and the resulting precipitate collected and dried to give about 252 mg. of $\Delta^{9(11)}$-cortexolone 17-acetate 21-mesylate, M.P. 203–205°. The analytical sample has M.P. about 208–210°, $[\alpha]_D+8.5°$ (chloroform).

*Analysis.*—Calc'd for $C_{24}H_{32}O_7S$: C, 62.04; H, 6.94; S, 6.90. Found: C, 62.58; H, 6.94; S, 6.86.

EXAMPLE 9

17α-acetoxy-$\Delta^{9(11)}$-progesterone

A solution of 100 mg. of $\Delta^{9(11)}$-cortexolone 17-acetate 21-mesylate and 150 mg. of sodium iodide in 3.0 ml. of glacial acetic acid is refluxed for 4 hours. The reaction mixture is diluted with 5% sodium bisulfite and water and the resulting precipitate filtered and dried to give about 73 mg. of crude material. Recrystallization from methanol gives about 53 mg. of 17α-acetoxy-$\Delta^{9(11)}$-progesterone, M.P. about 238–240°.

EXAMPLE 10

17α-acetoxy-9α-bromo-11β-hydroxy-progesterone

A solution of 250 mg. of 17α-acetoxy-$\Delta^{9(11)}$-cortexolone and 250 mg. of N-bromosuccinimide in 5 ml. of dioxane is treated with 0.25 ml. of 0.5 N perchloric acid and stirred at room temperature for 3 hours. Sodium bisulfite solution is added to the reaction mixture and it is then diluted with water and filtered. The precipitate of 17α-acetoxy-9α-bromo-11β-hydroxy-progesterone weighs about 250 mg.

EXAMPLE 11

17α-acetoxy-9β,11β-oxido-progesterone

19α-acetoxy-9α-bromo-11β-hydroxy-progesterone, 250 mg., in 25 ml. of methanol and 2.5 ml. of 10% sodium carbonate is stirred in an atmosphere of helium for 35 minutes. The reaction mixture is diluted with water and extracted with ethyl acetate. The ethyl acetate solution is washed with saturated brine, dried and evaporated to give 207 mg. of material. Two recrystallizations from methanol give 17α-acetoxy-9β,11β-oxido-progesterone, M.P., about 220–222°.

EXAMPLE 12

17α-acetoxy-9α-chloro-11β-hydroxy-progesterone

A solution of 43 mg. of 17α-acetoxy-$\Delta^{9(11)}$-progesterone and 20 mg. of N,N'-dibromo-dimethylhydantoin in 5.0 ml. of dioxane containing 1.0 ml. of 0.5 N perchloric acid is stirred at room temperature for 2½ hours. Sodium bisulfite solution is added to the reaction mixture, followed by water and it is then extracted with chloroform. The chloroform is washed with sodium bisulfite solution, brine, sodium bicarbonate solution, brine, dried and evaporated to give 50 mg. of crude 17α-acetoxy-9α-chloro-11β-hydroxy-progesterone.

Similarly, by following the procedure of Examples 8 through 10, but substituting another acylating agent for the acetic anhydride in Example 8, the corresponding 17α-esters are formed. Thus, propionic anhydride yields the 17-propionate; benzoyl chloride yields the 17-benzoate; and cyclohexanecarbonyl chloride yields the 17-cyclohexanecarbonate.

The invention may be variously otherwise embodied within the scope of the appended claims.

What is claimed is:

1. A pharmaceutical composition comprising a compound of the formula

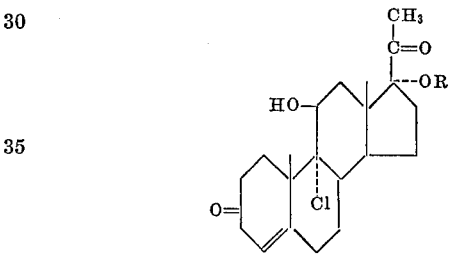

wherein R is the acyl radical of a hydrocarbon carboxylic acid and a pharmaceutically exceptable carrier.

2. The composition of claim 1, wherein R is the acyl radical of a hydrocarbon carboxylic acid of less than thirteen carbon atoms.

3. The composition of claim 1, wherein R is acetyl.

4. A compound of the formulae

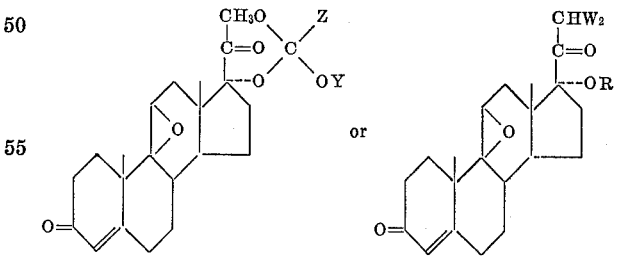

wherein Y is lower alkyl, Z is a hydrocarbon radical of less than twelve carbon atoms, R is the acyl radical of a hydrocarbon carboxylic acid of less than thirteen carbon atoms, and W is hydroxy, lower alkane sulfonyloxy or iodo.

5. The compound of the first formula in claim 4, wherein Y and Z are methyl.

6. The compound of the second formula in claim 4, wherein R is acetyl and W is hydroxy.

7. The compound of the second formula in claim 4, wherein R is acetyl and W is mesyloxy.

8. The compound of the second formula in claim 4, wherein R is acetyl and W is iodo.

(References on following page)

References Cited

UNITED STATES PATENTS

| | | | |
|---|---|---|---|
| 2,852,511 | 9/1958 | Fried | 260—239.55 |
| 2,963,498 | 12/1960 | Bergstrom et al. | 260—397.45 |
| 2,992,244 | 7/1961 | Hogg et al. | 260—397.45 |
| 3,082,220 | 3/1963 | Bowers et al. | 260—397.3 |
| 3,152,154 | 10/1964 | Ercoli et al. | 260—397.45 |

FOREIGN PATENTS 1,043,347  9/1966  Great Britain.

ELBERT L. ROBERTS, Primary Examiner

U.S. Cl. X.R.

260—239.55; 397.45

PO-1050
(5/69)

UNITED STATES PATENT OFFICE
CERTIFICATE OF CORRECTION

Patent No. 3,499,081  Dated March 3, 1970

Inventor(s) Gerald W. Krakower and Patrick A. Diassi

It is certified that error appears in the above-identified patent and that said Letters Patent are hereby corrected as shown below:

Column 1, Formula I, that portion of the formula reading:

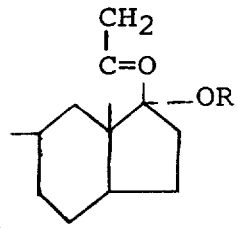   should read   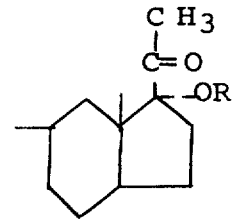

Column 6, line 42, "exceptable" should read -- acceptable --; and Claim 4, first formula, that portion reading:

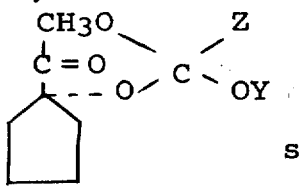   should read   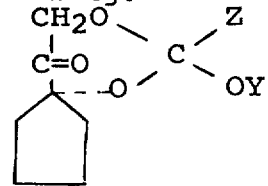

and second formula, that portion reading:

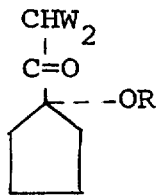   should read   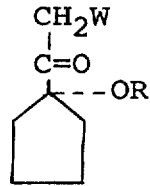

SIGNED AND
SEALED
AUG 25 1970

(SEAL)
Attest:

Edward M. Fletcher, Jr.
Attesting Officer

WILLIAM E. SCHUYLER, JR.
Commissioner of Patents